April 16, 1957  H. H. STRONG ET AL  2,789,245
ARC LAMP
Filed Sept. 30, 1953  5 Sheets-Sheet 1

INVENTOR.
Harry H. Strong
Arthur J. Hatch, Jr.
BY Carl A. Storks
John W. Winzeler Harry O. Ernsberger

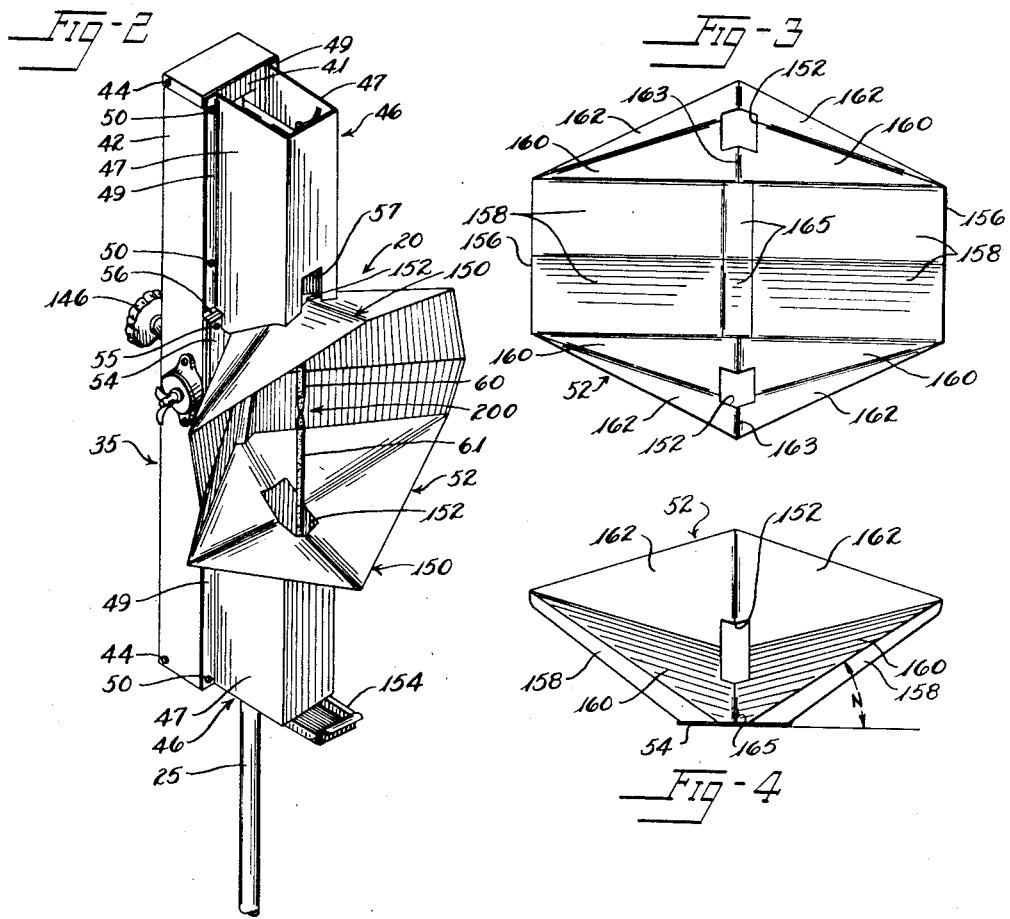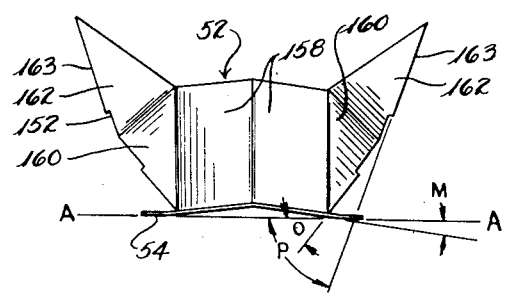

April 16, 1957     H. H. STRONG ET AL     2,789,245
ARC LAMP
Filed Sept. 30, 1953     5 Sheets-Sheet 3
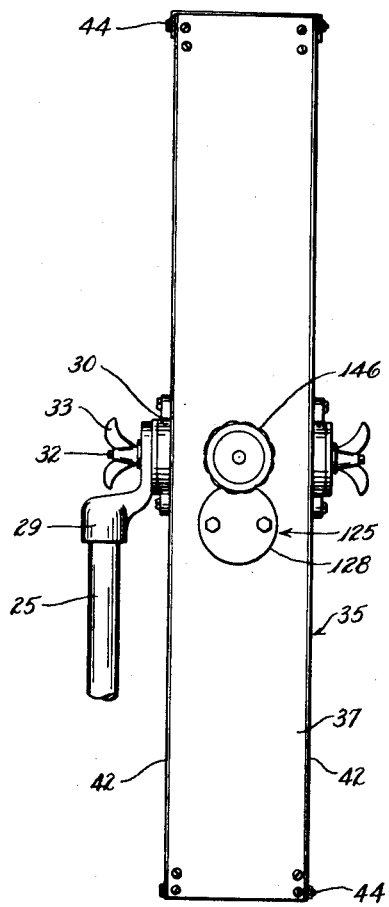
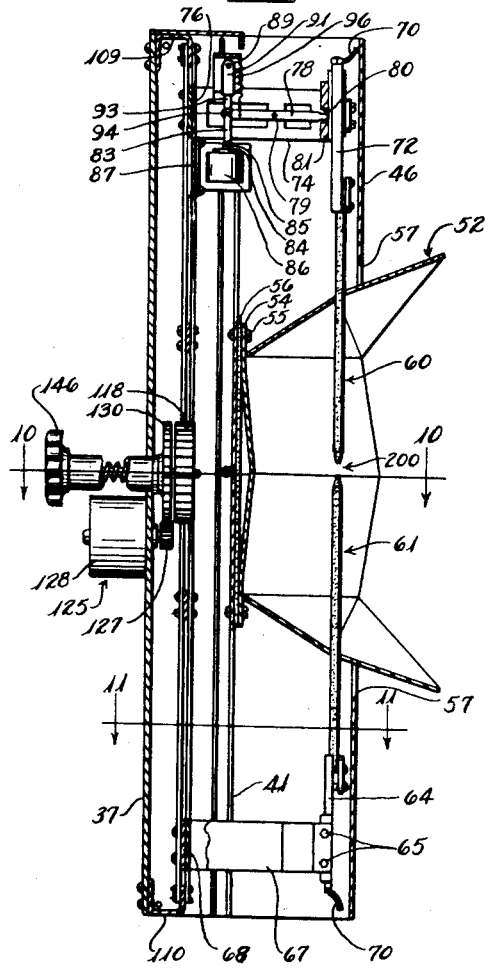
INVENTOR.
Harry H. Strong
Arthur J. Hatch, Jr.
BY Carl A. Starks
John W. Winzeler

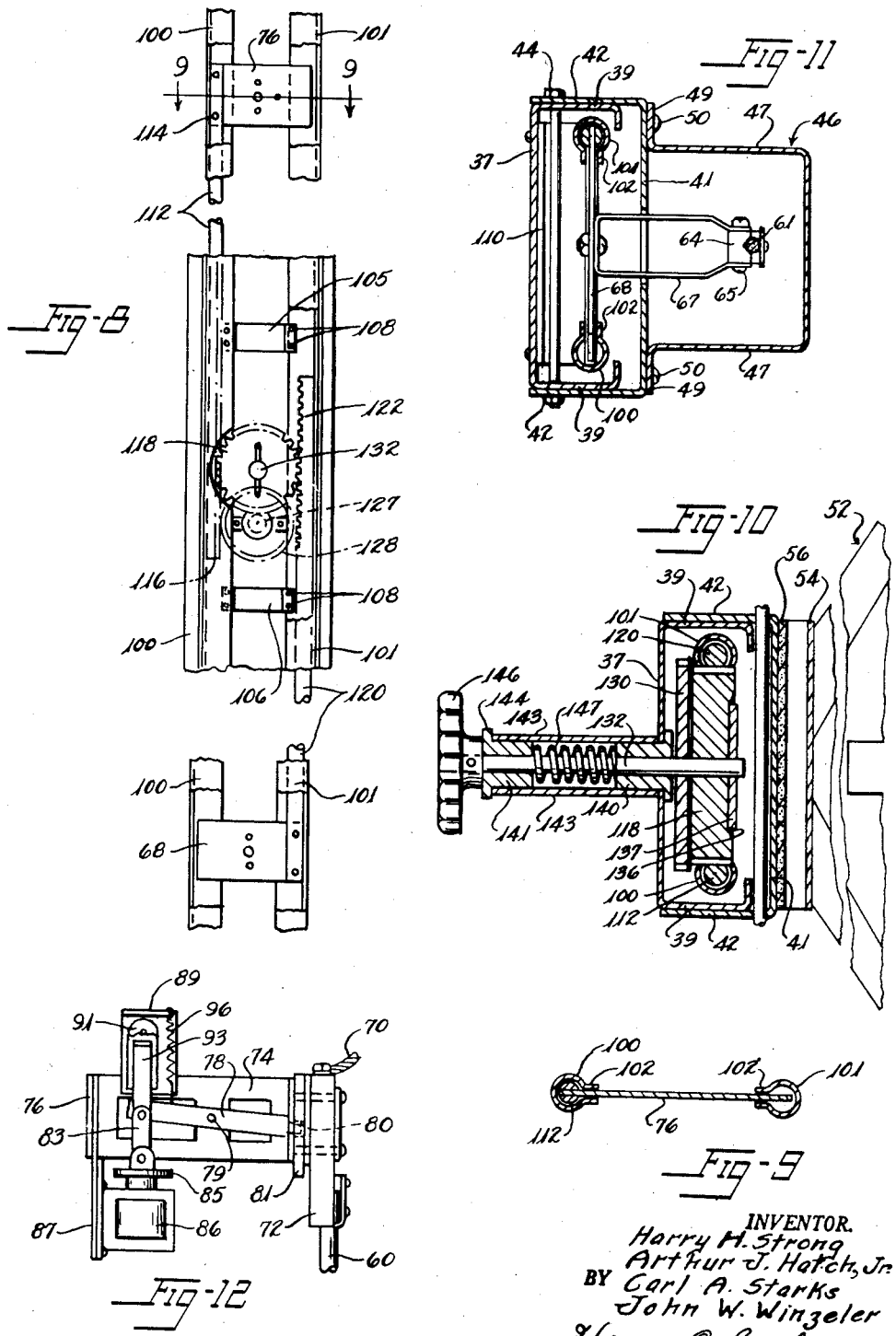

United States Patent Office 2,789,245
Patented Apr. 16, 1957

2,789,245

ARC LAMP

Harry H. Strong, Arthur J. Hatch, Jr., John W. Winzeler, and Carl A. Starks, Toledo, Ohio, assignors to The Strong Electric Corporation, Toledo, Ohio, a corporation of Delaware Application September 30, 1953, Serial No. 383,231

12 Claims. (Cl. 314—73)

This invention relates to arc lamps and more especially to arc lamps adapted for use in the graphic arts field and is usuable wherever a light of substantially constant intensity is desired, as in the theatrical field, the cinema field and other allied uses.

Arc lamps have been used in the graphic arts field and for kindred uses wherever it is desired to employ an intense source of illumination. Such lamps are particularly desirable in the graphic arts field where high intensity illumination is a necessity in order to produce satisfactory reproductions. One of the desirable characteristics of a lamp of this type is the provision of illumination which is substantially constant and which is not subject to variations in line voltage.

In graphic art work it is extremely desirable to obtain, as far as possible, a uniform distribution of light upon the work in order to avoid shadows and obtain clear and sharp definition. The lamps at present used for this purpose do not provide for uniform distribution of projected light. Due to the comparatively large amount of heat developed at the arc, it is impractical to utilize a closed reflector or light-projecting means; and by reason of the centration of light at the arc, a reflector or light-directing means should efficiently project the light in a manner to obtain some diffusion, tending to reduce light concentration in certain areas. The reflectors or light-directing means heretofore used do not obtain efficient and uniform distribution of projected light.

The present invention embraces a construction of arc lamp wherein the arc may be struck or obtained instantaneously upon the completion of an energizing circuit through the electrodes, the arrangement embodying automatic means for maintaining the proper spacing of the electrodes in order to obtain substantial constancy of illumination and color temperature with a minimum expenditure of electrical energy.

An object of the invention resides in a means for initiating or striking the arc from electrical energy supplied directly from a transformer means whereby the use of relays is eliminated and wherein such means is positive in its operation and is not impaired through long periods of operation.

Another object of the invention is the provision of means for automatically spacing the electrodes to secure constant illumination, the means embodying an auxiliary coil or instrumentality intercalated with the electrode spacing means for improving the control of the electrode spacing whereby a more constant illumination is provided than is attained in prior lamps.

Another object of the invention resides in the use of a power-operated relay for controlling the actuation of the carbon electrode spacing means in which current flows through an auxiliary winding associated with the relay whereby the spacing of the electrodes is not dependent solely upon the current flow through the electrodes but where a portion of electrical energy is diverted through the auxiliary winding in the circuit of the electrode or carbon spacing means, the arrangement rendering the operation of the relay more positive to control the spacing of the carbons to attain substantially uniform intensity of illumination.

Another object of the invention is the provision of an arc lamp embodying a reflector for directing light rays from the arc in a manner to attain substantially uniform distribution of illumination of a surface upon which the light is projected.

Another object of the invention is the provision of a reflector usable with an electrical arc as a light source for projecting a light pattern upon a surface in a manner to substantially avoid shadows and secure more uniform intensity of light on the surface being illuminated.

Another object of the invention is the provision of a reflector having a plurality of light-reflecting and diffusing surfaces disposed in angular relationship to direct or project bands or zones of partially diffused light onto a surface in a manner to distribute the light in a predetermined pattern.

Another object of the invention resides in an arrangement wherein means is provided for initiating or striking the arc and automatically maintaining the arc at predetermined intensity through the maintenance of substantially constant current flow through the arc.

Further objects and advantages are wtihin the scope of this invention such as relate to the arrangement, operation and function of the related elements of the structures, to various details of construction and to combinations of parts, elements per se, and to economies of manufacture and numerous other features as will be apparent from a consideration of the sepcification and drawing of a form of the invention, which may be preferred, in which:

Figure 2 is an isometric view of one of the lamp units of the invention showing the particular relation between the reflector and the electrodes between which the arc is formed;

Figure 3 is a front elevational view of a reflector forming a component of the invention;

Figure 4 is a top plan view of the reflector shown in Figure 3;

Figure 5 is a side elevational view of the reflector;

Figure 6 is a rear view of a lamp unit with the reflector removed;

Figure 7 is a vertical sectional view through the lamp construction of the invention;

Figure 8 is a fragmentary elevational view illustrating the drive mechanism for the electrode-supporting means;

Figure 9 is an enlarged sectional view taken substantially on the line 9—9 of Figure 8;

Figure 10 is a detail sectional view taken substantially on the line 10—10 of Figure 7;

Figure 11 is a sectional view taken substantially on the line 11—11 of Figure 7;

Figure 12 is an elevational view of the arc-striking mechanism, certain parts being in section

While the lamp arrangement of the present invention is particularly adaptable for use in the graphic arts field, it is to be understood that the lamp of the invention may be utilized wherever substantially constant intensity of illumination is desired.

Figure 1:
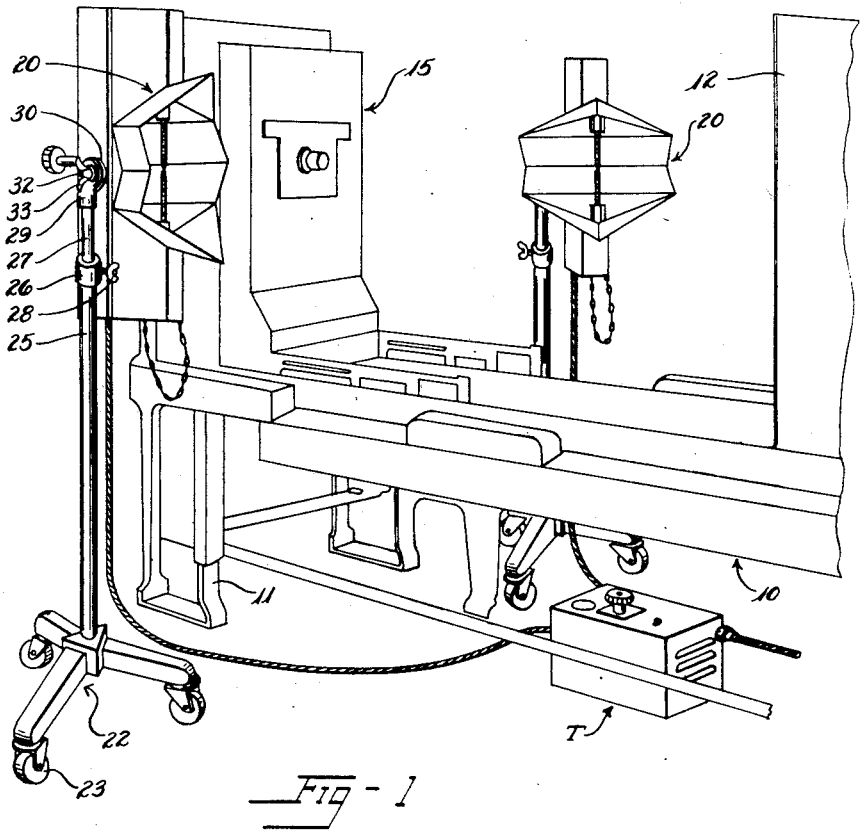
Figure 1 is a semidiagrammatic view illustrating a pair of lamp units of the invention and a mode of use therefor.

Referring to the drawings, and first with respect to Figure 1, there is illustrated a pair of the lamp units of the invention illustrating their use with a form of photographic reproduction apparatus. As shown in Figure 1, the photographic apparatus is inclusive of a frame 10 mounted upon legs 11, the frame supporting a projection board or surface 12 which is adjustable longitudinally of the frame 10. At the opposite end of the frame is a housing 15 enclosing apparatus for making photographic reproductions of work mounted on the projection board 12. The housing 15 may be supported for adjustment longitudinally of the frame 10.

As shown in Figure 1, two lamp units 20 of identical construction are disposed one at each side of the frame 10 for directing or projecting intense light from the arcs of the lamps upon the objects or work carried by the planar surface of the board 12. While it is preferable to utilize two lamp units in the manner illustrated in Figure 1, it is to be understood that one or any number of units may be utilized.

Each lamp unit is mounted upon suitable supporting means such as that shown in Figure 1. The illustrated supporting means includes a tripod-like base 22 mounted upon wheels or casters 23 for purposes of portability. The central zone of the base 22 supports an upwardly extending tubular member 25 within which is telescoped a rod or tube 27, the upper end of the rod being provided with a fitting 29 which mates with a fitting 30 secured to the housing of the lamp structure. The fittings 29 and 30 are joined together by means of a threaded member 32 equipped with a wing nut 33. By drawing up the wing nut 33, the fittings 29 and 30 may be held in fixed relationship thus supporting the lamp unit 20 in position. By swiveling the fitting 30 relative to the fitting 29 about the axis of the threaded member 32, the lamp unit may be adjusted to any desired angular position. The upper end of the tube 25 is provided with a collar 26 having a threaded opening accommodating a set screw 28 which may be drawn up to hold the rod 27 in any position of vertical adjustment and thus regulate the height of the lamp unit.

With particular reference to Figures 2 and 6 through 11, the arc lamp is inclusive of a frame 35 formed of several members and includes a frame member 37, preferably fashioned of sheet metal of channel-shaped cross section, providing opposed wall portions 39. A second channel-shaped frame member 41 is adapted to be secured to the member 37, the leg or wall portions 42 of member 41 being disposed in contiguous relation with the walls 39 of the frame member 37. The members 37 and 41 are secured together by bolts 44 passing through aligned openings in the contiguously disposed side walls of the channel-shaped members.

Also forming a part of the frame structure is a pair of channel-shaped members 46 having opposed walls or leg portions 47 which extend toward the member 41 as shown in Figure 2. The wall portions 47 terminate in laterally extending flanges 49 which are adapted to engage the exterior surface of channel-shaped member 41 as shown in Figures 2 and 11, the members 46 being secured to member 41 by means of screws or bolts 50 passing through aligned openings in the flanges 49 and the web portion of the member 41. It will be apparent that the members 37, 41 and 46 provide a frame structure as well as a housing means for supporting and enclosing component elements of the lamp structure.

The lamp arrangement is provided with a reflector construction 52 having portions engaging the members 46 as shown in Figures 2 and 7. The reflector 52 is provided with a backing plate 54 welded or otherwise secured to the reflector, the plate 54 being supported by bolts 55 extending through registering openings in flanges 49 and the web portion of the channel-shaped member 41. An insulating plate 56, such as an asbestos plate, may be interposed between the rear of the reflector and the member 41 to retard transmission of heat from the reflector to the mechanism contained within the enclosure formed by the channel-shaped members 37 and 41. Portions of members 46 adjacent the reflector 52 are provided with ventilating openings 57 to facilitate radiation of heat away from the arc. The configuration of the reflector forms a component of the present invention in projecting the light from the arc to avoid shadows, and a more detailed description of the reflector is hereinafter set forth.

The members 37, 41 and 46 form a housing or enclosure for mechanism supporting the carbon electrodes or carbons, the means for striking the arc by separating the electrodes and the drive means for automatically maintaining the electrodes in spaced relation during operation in order to obtain the most efficient arc with a minimum of current consumption. The arc is formed between two electrodes or carbons 60 and 61 which are in axially aligned relation as shown in Figures 2 and 7.

As shown in Figures 7 and 11, the lower electrode 61 is securely clamped to a fitting 64 which is secured by bolts 65 to a bracket 67 formed of sheet metal, the bracket being secured to a plate 68. The plate 68 is carried by relatively movable means in order to provide for spacing the electrodes in a manner hereinafter explained. Current is supplied to the electrode 61 by a flexible current conductor or cable 70.

The upper electrode 60 is clamped to a plate or fitting 72 which is slidably supported in suitable grooves formed in the opposed walls of a U-shaped bracket 74 which is supported upon a plate 76 which, in turn, is carried by a movable means for adjusting the relative positions of the electrodes or carbons 60 and 61. The construction supporting the electrode 60 includes means for independently moving the electrode 60 with respect to the electrode 61 in order to strike or form an initial gap between the electrodes to produce the arc when current is flowing through the electrodes. This arrangement is illustrated in Figures 7 and 12 and includes a lever 78 which is pivoted or fulcrumed by means of a pin 79 carried by the walls of bracket 74. One end of the lever 78 extends into a slot 80 formed in a fitting or member 81 secured to the plate 72 and the other end of the lever 78 is pivotally connected to a link 83 which, in turn, is pivotally connected to an armature 85 of a solenoid device 86, the solenoid device 86 being carried by a depending portion 87 of bracket 74.

Secured to the bracket 74 is an upwardly extending bracket or member 89 to which is pivotally supported a relatively short cylinder 91 within which is slidably disposed a plunger 93, the latter also being pivotally connected to the lever member 78 by means of a pivot pin 94 passing through registering openings in the lever member 78, the link 83 and plunger 93. A contractile coil spring 96 is connected at its upper end to the bracket 89 and at its lower end to the lever 78, the spring serving to bias the lever for movement in a clockwise direction, as viewed in Figure 7, about its pivot 79 so as to resiliently urge the electrode or carbon 60 into contact with the extremity of the electrode or carbon 61.

The plunger 93 extending into the bore in the member 91 provides a dashpot means for preventing rapid movement of the lever 78 under the influence of the solenoid 86 when the latter is energized in order to retard the separating movement of electrode 60 from electrode 61 in initiating or striking the arc between the electrodes.

Means is provided for automatically maintaining the electrodes 60 and 61 in properly spaced relation to provide the most efficient arc between the electrodes. Disposed within the channel-shaped member 37 is a supplemental frame which is inclusive of a pair of tubular members 100 and 101 arranged in substantially parallel relation, each having extending flanges 102 which are spaced to provide a longitudinally extending slot. The slots are of a width to receive connecting members or plates 105 and 106 which are secured to members 100 and 101 by means of bolts 108. The members 100 and 101 are joined at their ends by means of brackets 109 and 110 which with plates 105 and 106 hold the members 100 and 101 in parallel relation.

Disposed within the tubular member 100 is a rod 112, preferably of circular cross section, which is secured at its upper end to the plate 76 by means of rivets 114. The lower zone of the rod 112 is formed with rack teeth 116 adapted for enmeshment with the teeth of a gear 118. The tubular member 100 provides a guiding means for the rod or bar 112.

Slidably disposed in the tubular member 101 is a second rod 120. The upper portion of the rod 120 is formed with a toothed rack portion 122 also adapted to mesh with teeth of the gear 118 as shown in Figure 8. It will be obvious that rotation of the gear 118 will move rods 112 and 120 simultaneously in opposite directions. The lower electrode holder or bracket 67 is secured to and carried by plate 68, and the means supporting the upper electrode 60 is secured to the plate 76 carried by rod 112. Thus movement of the rods 112 and 120 will move the electrodes 60 and 61 toward or away from each other, depending upon the direction of rotation of the gear 118.

As shown in Figure 7, the gear 118 is adapted to be driven by a pinion 127 rotated by an electric motor 125. The motor 125 is preferably of the quarter-phase type so that the armature rotates at a comparatively slow speed. The motor armature is arranged to drive the pinion 127 at a comparatively low speed through reduction gearing (not shown) contained within the motor housing 128 which is secured to and supported by the channel-shaped frame member 37. The pinion 127 is enmeshed with a gear 130 loosely journaled upon a shaft 132 shown in Figure 10. The gear 130 is disposed adjacent and in frictional contact with a surface of gear 118 which is also supported upon shaft 132. The face of gear 118 opposite gear 130 is formed with a groove 136 adapted to accommodate a pin 137 which passes through a transverse opening in shaft 132 and serves to establish a drive connection between gear 118 and shaft 132.

Means is associated with shaft 132 for establishing sufficient friction between gears 118 and 130 whereby rotation of the motor-driven pinion 127 rotates gear 130, the latter rotating gear 118 to effectively adjust the positions of the electrodes 60 and 61.

As particularly shown in Figure 10, the shaft 132 extends through two guide bushings or bearing members 140 and 141 through which extends the shaft 132. The bushings extend into opposite ends of a sleeve or spacer member 143, one end of the sleeve abutting the rear face of the web portion of channel-shaped member 37, the other end abutting a flange 144 formed on bushing 141. A manipulating or hand wheel 146 is pinned or otherwise secured upon the outer end of shaft 132. Disposed between the bushings 140 and 141 and enclosed within the sleeve 143 is an expansive coil spring 147 which exerts a bias or pressure upon gear 130 to hold the same in frictional engagement with gear 118. Through this arrangement, sufficient friction is established between the contiguous faces of gears 118 and 130 to establish a drive connection therebetween to actuate the rods 112 and 120.

The above-described arrangement provides a manual means for adjusting the positions of the rods 112 and 120 and, hence, positioning the electrodes 60 and 61. By rotating hand wheel 146, the gear 118 may be rotated through the drive connection established with shaft 132 by the pin 137 to rotate gear 118 independently of gear 130. Thus during manual adjustment of the electrodes, the motor 125, pinion 127 and driven gear 130 will not be affected.

The reflector 52, supported by the frame, is shaped to direct or project rays of light from the arc in overlapping bands or zones. The shape or configuration of the reflector is particularly illustrated in Figures 2 through 7. The reflector includes a plurality of uniplanar surfaces angularly arranged, one with respect to another, in order to provide satisfactory distribution of light from the arc. The upper and lower zones of the reflector are symmetrical about a horizontal plane through the arc and the right and lefthand zones are symmetrical about a vertical plane through the axis of shaft 132 and the electrodes. The upper and lower plates or surfaces 150 of the reflector are of substantially identical shape, and each is provided with a rectangularly shaped window or opening 152 for ventilating purposes, the window in the lower reflector portion 150 permitting oxidized material or ash from the arc to pass downwardly into a slidable ash-receiving receptacle or tray 154 carried at the extremity of the lowermost member 146.

The reflector sections 156, disposed at either side of the vertical plane through the electrodes, are also of identical construction; hence, a description of panels, surfaces or zones of one quarter section of the reflector is applicable to the other sections. The reflector panel or zone 158 is arranged with respect to a vertical plane A—A, shown in Figure 5, at an angle M of 8° and at a forwardly directed angle N of 31½° shown in Figure 4. The angle O of the zone 160, with respect to the vertical plane A—A at the central zone of the reflector, is arranged at 51½° with respect to the plane A—A. The zone or panel 162, at its apex 163, is arranged at an angle P of 69½° from the plane A—A. It should be noted that each of the zones or panels 160 and 162 is of triangular configuration, the adjacent legs of the triangles bounding these zones being congruent at a common apex line 163. The pairs of panels 158 are of rectangular configuration and their innermost contiguous edges terminate at zones 165 at the base of the reflector. The zones 165 are arranged with respect to the plane A—A at substantially the angle M of 7½° as shown in Figure 5.

Through the arrangement of uniplanar surfaces or zones disposed in the various angular positions as described above, the light from the arc between electrodes 60 and 61 is distributed in substantially flat bands of light which overlap on a flat surface, such as the surface area of the projection board 12 shown in Figure 1, to obtain a substantially uniform distribution of light over the area. The light-reflecting areas of the reflecting zones are preferably formed with a nonglare or light-diffusing coating or finish, for example, a coating of aluminum paint or the like, to avoid definite shadow lines upon the surface receiving the projected light. Nongloss paints or resins capable of withstanding heat may also be used as coatings for the light-reflecting surfaces, or the surfaces may be of natural aluminum finish. Aluminum readily oxidizes to a certain extent under atmospheric conditions, and the oxidized surface provides a satisfactory diffusing-reflecting medium for the several light-projecting and reflecting zones of the reflector.

Figure 13:
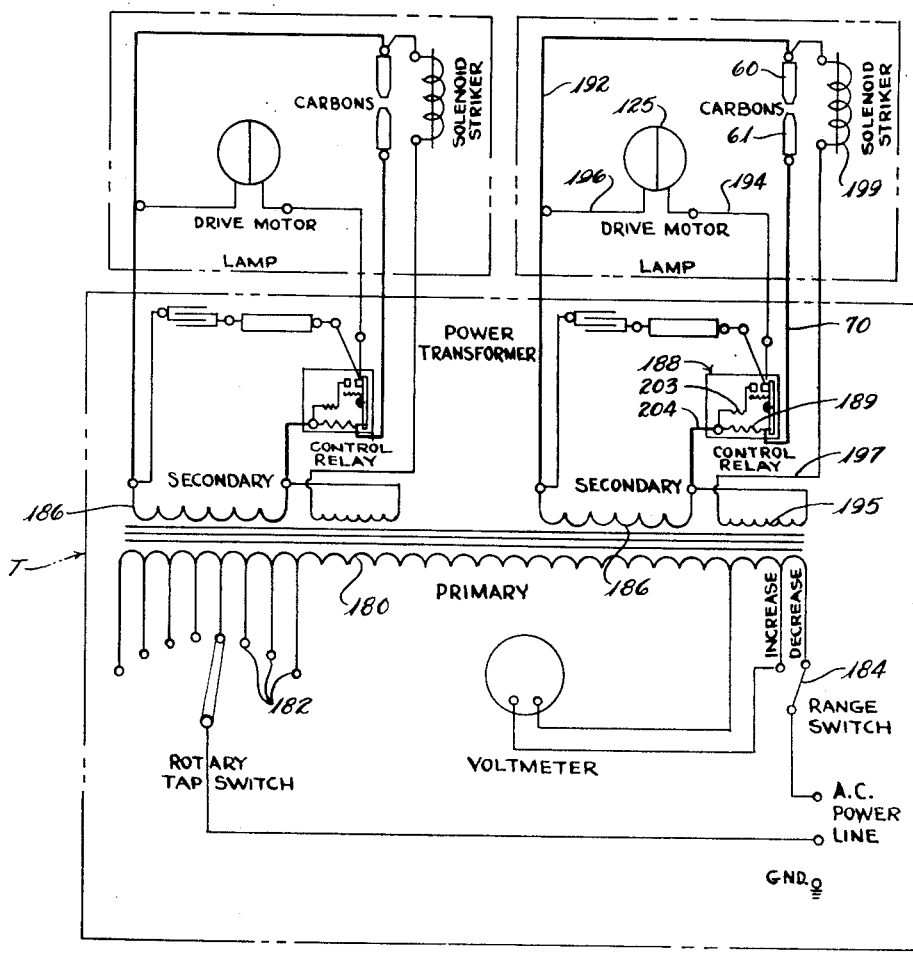
Figure 13 is a diagram of the electrical circuits for the power transformer and lamp units.

A circuit diagram for a pair of arc lamp constructions operated from a single transformer is illustrated in Figure 13. As diagrammatically illustrated, the transformer T comprises a primary winding 180, a portion of which is provided with a series of taps 182. A range switch 184 is also included in the primary circuit for a coarse adjustment of the primary winding, a fine adjustment being attained through the tap switch contacts 182.. These switches are provided in order to accommodate the arrangement to voltage of the line with which the transformer is connected. In the illustrated embodiment, the transformer is provided with two secondary windings 186, the secondaries being respectively connected in the circuits of the two arc lamp units.

As the circuits for the arc lamp units are identical only one will be described in detail herein. One end of a secondary winding 186 is connected to a current-responsive relay 188 through the relay winding 189 thereof and conductor 70 to the electrode 61. The other electrode 60 is connected, by means of conductor 192, with the opposite end of the secondary winding 186. One of the contacts of the current-responsive relay 188 is connected by conductor 194 with the drive motor 125, the other lead 196 from the motor being connected to the conductor 192 and thence to the secondary winding 186. The operation of the relay 188 controls the actuation of the drive motor 125.

The present arrangement includes a winding associated with the transformer T for striking the arc, that is, moving the electrodes 60 and 61 apart when current is flowing through the electrode circuit in order to establish the arc. As shown in Figure 13, the transformer is provided with an auxiliary or supplemental winding 195 which is in opposition to the adjacent secondary winding 186. The winding 195 is connected by means of a conductor 197 with a coil 199 of the solenoid 86, one end of the coil 199 being connected with the conductor 192 of the electrode circuit.

The secondary winding 186 of the transformer is loosely coupled with the primary winding 180 and the auxiliary winding 195 is closely coupled with the primary winding. The differential in voltage impressed in the secondary winding 186 and the auxiliary winding 195 coupled with a phase shift of the secondary under heavy load is utilized to actuate or energize the winding 199 of the mechanism for separating the electrodes 60 and 61 for striking the arc. Assuming that the electrodes or carbons 60 and 61 are in contact and it is desired to establish the arc, current is delivered to the primary winding of the transformer from the source of current supply. As the electrodes are closed, that is, in contacting relation, a comparatively large amount of current flows through the secondary 186. This causes a substantial drop in voltage in the secondary. Simultaneously voltage is impressed in the closely coupled auxiliary winding 195 which is of a substantially constant value. Concomitantly with the voltage drop in the secondary 186 under load, a substantial phase shifting occurs such that there is established a differential or resultant voltage vector of sufficient value to energize the coil 199 of the solenoid device 86, actuating lever 78 to cause the separation of the electrodes 60 and 61 to strike the arc at zone 200 at the tips of the electrodes. After the arc is established, the current flow in the secondary 186 is decreased, but there still remains a sufficient differential voltage effective on the solenoid coil 199 to hold the armature 84 and the lever 78 in position maintaining the electrodes in spaced relation.

The function of the drive motor 125 is to compensate for the burning away or consumption of the carbon electrodes, the motor operating in a direction to move the electrodes toward each other as the carbons are burned away so as to maintain an arc of substantially constant intensity between the electrodes. The current-responsive relay 188 includes an auxiliary or supplemental coil 203. One end of the coil 203 is connected to the current supply conductor leading from the secondary 186 to one side of the main coil 189. The other end of the supplemental coil 203 is connected to one of the contacts of the relay 188, thus placing the coil 203 in series in the motor circuit. In practice it has been found that an auxiliary or supplemental coil 203 consisting of approximately 80 turns of #28 insulated copper wire is satisfactory for the purposes herein set forth. The supplemental coil 203 is wound in a direction to augment or increase the magnetic flux of the coil 189 of the relay and thus increase the number of magnetic lines of force acting upon the relay armature to overcome the inertia of the armature and the biasing action of the conventional armature spring.

The control of the spacing of the electrodes 60 and 61 through the drive motor 125 is as follows. After the arc is struck by current flow through the solenoid striker coil 199, the electrode 60 is pulled away from electrode 61 which establishes the arc. The contacts of the current-responsive relay 188 are normally biased to closed position under the influence of a biasing spring. When the arc is established, current flows through coils 189 and 203, tending to open the contacts of the relay. As long as the contacts are closed, the motor 125 is energized and moves the carbons toward each other until the current flowing through coil 189 increases until sufficient magnetic forces are set up to actuate the armature of the relay and open the contacts controlling the motor circuit. When the contacts are opened, the motor comes to rest and the proper spacing of the electrodes has been established to provide the desired intensity of the arc. As the electrodes burn away at the zone of the arc, the current flow through the arc decreases; and when the current is decreased to a predetermined value, the pull on the armature is decreased and the relay contacts are closed under the influence of the biasing spring to energize the motor 125 which moves the carbons toward each other until the magnetic flux set up by current flow through coils 189 and 203 is sufficient to actuate the armature to open the contacts of the motor circuit.

It should be noted that the current for operating the motor 125 flows through the supplemental coil 203 of the relay. The coil 203 is arranged so that the magnetic line of force or flux established by current flow through the coil 203 augment the magnetic forces or flux established by current flow through the main relay coil 189. The armature of the relay is therefore urged to contact-closed position by the combined magnetic forces established by current flow through both coils 189 and 203. By this means, a substantial armature holding force is established which, when overcome by the relay spring, results in a rapid movement of the armature to open the contacts to interrupt the motor circuit and in this manner a fluttering of the movable contact of the relay 188 is avoided. As the arc gap increases due to the burning of the tips of the carbons, less current flows through the arc and, hence, there is a decreased current flow through the relay winding 189. This decrease in current flow is accompanied by an increase in voltage in the circuit through the auxiliary relay coil 203. The contacts of the relay are thus maintained in closed position under the influence of the magnetic flux established by both windings 189 and 203. The armature is therefore held in closed position by magnetic flux which is a function of both the current flow and voltage of the current at the arc. Through this arrangement a very effective means is provided for urging the contacts to closed position until the current flow through the arc has decreased to a value whereby the spring of the relay armature overcomes the magnetic forces to cause a sudden and positive separation of the contacts of the motor circuit.

It is apparent that, within the scope of the invention, modifications and different arrangements may be made other than is herein disclosed, and the present disclosure is illustrative merely, the invention comprehending all variations thereof.

We claim:

1. In an arc lamp including a pair of electrodes between which an arc is to be established, in combination, a frame; a pair of electrode carriages, each adapted to support one of the electrodes; a pair of rods of circular cross section; guide means carried by said frame for maintaining said rods in parallel relation, said rods respectively supporting said electrode carriages; a plurality of teeth formed on portions of each of said rods; a gear meshing with the teeth of both of said rods; an electric motor; reduction gearing connected with said motor for driving said gear from said motor, said drive means including a friction connection; a power circuit to the electrodes; a motor circuit; electromagnetic means for moving one of said electrodes relative to the other, and a relay in circuit with said motor and said electrode power circuit adapted to be actuated by current flowing through said electrodes and said motor, said electromagnetic means being actuated independently of said relay, said relay being responsive to current flowing through said electrodes and said motor for controlling the energization of the electric motor to move said electrodes to maintain substantially constant the arc current flowing between said electrodes.

2. In an arc lamp, in combination, a frame; a pair of electrode carriages mounted for relative movement on said frame; means for supporting an electrode upon each of said carriages in axial relationship; means for moving said carriages to vary the space between said electrodes, said means including an electric motor; a transformer having primary and secondary windings; current-responsive means in circuit with said electrodes and said secondary winding for controlling the operation of said motor to maintain a predetermined arc space between said electrodes; electromagnetic means for moving one of said electrodes relative to its supporting carriage to strike the arc, and means including an auxiliary winding in said transformer connected to and wound in opposition to the secondary of said transformer for establishing energy flow through said electromagnetic means for striking the arc.

3. In an arc lamp including a pair of electrodes between which an arc is to be drawn, in combination, a pair of electrode-supporting carriages; an electric motor for moving said carriages simultaneously in directions toward each other to regulate the arc space between the electrodes; a transformer having primary and secondary windings; a power circuit from said secondary winding through said electrodes and said motor; means for moving one of said electrodes relative to the other; an auxiliary winding in said transformer associated with said secondary winding and in opposition thereto for energizing the means to move one of the electrodes, and a relay in said power circuit, said relay having a winding arranged in series in said motor circuit, said relay being operative by energy flow through said electrodes and said motor circuit to cause said motor to move the electrodes toward each other to maintain substantially constant the arc current flowing between the electrodes.

4. In an arc lamp including a pair of electrodes between which an arc is to be drawn, in combination, a pair of electrode-supporting carriages; an electric motor for moving said carriages simultaneously in directions toward each other to regulate the arc space between the electrodes; a transformer having primary and secondary windings; a power circuit from said secondary winding through said electrodes; an electromagnet for causing relative movement between said electrodes; an auxiliary winding associated with said secondary winding of the transformer for establishing energy flow through said electromagnet to cause relative movement between said electrodes, and means intercalated in the said power circuit for controlling the operation of the motor.

5. In an arc lamp including a pair of electrodes between which an arc is to be established, in combination, a pair of electrode carriages, each adapted for supporting one of said electrodes; solenoid-actuated means for effecting a separation of said electrodes to establish an arc; an electric motor; means for connecting said electric motor and said carriages for moving said electrodes toward each other to maintain a predetermined arc space between the electrodes; a transformer having primary and secondary windings; a power circuit from said secondary winding through said electrodes; a current-responsive relay in said electrode power circuit for controlling the operation of said motor, and an auxiliary winding associated with the secondary of said transformer for energizing the solenoid of said solenoid-actuated means.

6. In an arc lamp including a pair of electrodes between which an arc is to be established, in combination, a frame; a pair of electrode carriages, each capable of supporting one of said electrodes; means for effecting a separation of said electrodes to establish an arc between the electrodes; electrically energized means for maintaining a predetermined space between said electrodes for maintaining an arc of predetermined intensity, and a reflector for projecting light rays emanating from the arc in a direction generally forwardly of the lamp, said reflector including side panels of generally rectangular shape, said side panels being arranged in pairs, the panels of each pair being convergingly arranged and joined at a horizontal plane passing through the zone of the arc, each pair of side panels converging rearwardly of the electrodes, said reflector including upper and lower portions symmetrically disposed about a forwardly directed plane through the electrodes, said upper and lower sections each comprising a plurality of triangularly shaped sections, the triangular sections being disposed in different angular positions whereby light rays reflected from the rectangular panels and triangularly shaped sections overlap on a surface to which they are projected.

7. In an arc lamp including a pair of electrodes between which an arc is to be established, in combination, a frame; a pair of electrode carriages, each capable of supporting one of said electrodes; means for effecting a separation of said electrodes to establish an arc between the electrodes; electrically energized means for maintaining a predetermined space between said electrodes for providing an arc of predetermined intensity, and a reflector for projecting light rays emanating from the arc in a direction generally forwardly of the lamp, said reflector including side panels of generally rectangular shape, said side panels being arranged in pairs, the panels of each pair being convergingly arranged and joined substantially at a horizontal plane passing through the zone of the arc, each pair of side panels converging rearwardly of the electrodes, said reflector including upper and lower portions symmetrically arranged about a forwardly directed plane through the electrodes, said upper and lower sections each comprising two pairs of triangularly shaped sections, the triangular sections of each pair being disposed in different angular relationship with respect to a horizontal plane through the zone of the arc.

8. In an arc lamp, in combination, a frame; electrode-supporting carriages mounted for relative movement on said frame; means for effecting a separation of said electrodes for striking the arc; a pair of rods slidably supported upon the frame, said rods being respectively connected to said carriages, said rods being formed with toothed rack portions; a gear enmeshed with said rack portions; a shaft supporting said gear; a second gear loosely mounted on said shaft and having a surface in engagement with a surface of said first-mentioned gear; a spring associated with said shaft for biasing said gears into frictional driving relationship; manipulating means mounted on said shaft for manually rotating said first-mentioned gear to regulate the relative positions of said electrodes; an electric motor, and means for establishing a driving connection between said motor and said second-mentioned gear whereby said first-mentioned gear is rotated when said motor is operated.

9. In an arc lamp, in combination, a frame; electrode-supporting carriages mounted for relative movement on said frame; electrically energized means for causing movement of one of said electrodes independently of the other for striking the arc; a pair of rods slidably supported upon the frame, said rods being respectively connected to said carriages, said rods being formed with toothed rack portions; a gear enmeshed with said rack portions; a shaft supoprting said gear; a second gear loosely mounted on said shaft and having a surface in engagement with a surface of said first-mentioned gear; a spring associated with said shaft for biasing said gears into frictional driving relationship; manipulating means mounted on said shaft for manually rotating said first-mentioned gear to regulate the relative positions of said electrode carriages; an electric motor; means for establishing a driving connection between said motor and said second-mentioned gear whereby said first-mentioned gear is rotated when said motor is operated; a power circuit for said electrodes; a current supply circuit for said motor; means intercalated in said power circuit for controlling the operation of the motor to maintain the current flow through the electrodes substantially constant; a transformer having a secondary winding for supplying electric current to said electrodes and to said motor, and auxiliary winding on the transformer associated with the secondary winding for establishing current flow to the electrically energized means to effect a separation of the electrodes to establish the arc.

10. In an arc lamp, the combination of a frame; upper and lower carriages mounted for relative movement on said frame; means for supporting a carbon electrode on each of said carriages, said carbon electrodes being arranged in coaxial relation; means for supporting said carriages for simultaneous movement in a direction toward each other to regulate the space between said electrodes; motor-operated means for actuating said carriage-moving means; a reflector supported by said frame and having a plurality of rectangular and triangular surfaces disposed in angular relationship for projecting rays of light from the arc between the carbon electrodes; a power circuit for said carbon electrodes; a circuit for said motor, and a relay for controlling the operation of said motor, said relay having windings in series with the electrode power circuit and the motor circuit and arranged whereby current flowing through said elcetrodes and through said motor is effective to interrupt the motor circuit when a predetermined current flow is established through said electrodes.

11. Apparatus of the character disclosed including, in combination, a current-consuming device; a transformer having primary and secondary windings, said secondary winding being loosely coupled with the primary winding; a circuit for the current-consuming device including the secondary winding; an auxiliary winding closely coupled with the primary winding of the transformer; an electrically energizable instrumentality in circuit with the auxiliary winding adapted to be energized by differential voltage established upon current flow through the current-consuming device for controlling current flow through said device.

12. Apparatus of the character disclosed including, in combination, a pair of relatively movable electrodes; a transformer having primary and secondary windings, said secondary winding being loosely coupled with the primary winding; a supplemental winding closely coupled with the primary winding; a circuit for said electrodes including the secondary winding; an instrumentality for effecting a separation of the electrodes to establish an arc therebetween; a circuit for said instrumentality including the supplemental winding, said instrumentality being actuated to separate said electrodes by voltage impressed in said supplemental coil upon current flow through said secondary winding and the electrodes when the latter are in contacting relation.

References Cited in the file of this patent

UNITED STATES PATENTS

| | | |
|---|---|---|
| 1,239,759 | Baker | Sept. 11, 1917 |
| 1,551,558 | Hallberg | Sept. 1, 1925 |
| 1,571,924 | Kenyon | Feb. 2, 1926 |
| 1,625,315 | Hall | Apr. 19, 1927 |
| 1,662,434 | Palmer | Mar. 13, 1928 |
| 1,987,705 | Pederson | Jan. 15, 1935 |
| 2,513,512 | Olthof | July 4, 1950 |